United States Patent
Werner

(10) Patent No.: US 6,340,869 B1
(45) Date of Patent: Jan. 22, 2002

(54) METHOD FOR OPERATING DIRECT CURRENT METAL HALOGEN ARC LAMP CIRCUIT PERTAINING THERETO

(75) Inventor: Frank Werner, Berlin (DE)

(73) Assignee: Patent-Treuhand-Gesellschaft für Elektrische Glühlampen mbH, Munich (DE)

( * ) Notice: Subject to any disclaimer, the term of this patent is extended or adjusted under 35 U.S.C. 154(b) by 0 days.

(21) Appl. No.: 09/485,143

(22) PCT Filed: Jul. 16, 1998

(86) PCT No.: PCT/DE98/01993

§ 371 Date: Feb. 3, 2000

§ 102(e) Date: Feb. 3, 2000

(87) PCT Pub. No.: WO99/08492

PCT Pub. Date: Feb. 18, 1999

(30) Foreign Application Priority Data

Aug. 5, 1997 (DE) .......................... 197 33 806

(51) Int. Cl.[7] ............................................. H05B 37/00
(52) U.S. Cl. .................... 315/291; 315/246; 315/360
(58) Field of Search ..................... 315/291, 94, 246, 315/307, 360; 313/621, 637; 314/135

(56) References Cited

U.S. PATENT DOCUMENTS

| 4,373,146 A | * | 2/1983 | Bonazoli et al. ............ 315/246 |
| 4,410,837 A | * | 10/1983 | Suzuki et al. .............. 315/289 |
| 4,680,509 A | * | 7/1987 | Fallier, Jr. et al. .......... 315/290 |
| 4,904,903 A | * | 2/1990 | Pacholok .................. 315/307 |
| 4,937,505 A | * | 6/1990 | Deglon et al. ............... 315/307 |
| 5,047,695 A | | 9/1991 | Allen et al. ................. 315/291 |
| 5,198,727 A | | 3/1993 | Allen et al. ................. 315/291 |
| 5,932,976 A | * | 8/1999 | Maheshwari et al. ......... 315/307 |
| 6,111,359 A | * | 8/2000 | Work et al. ................. 315/246 |

FOREIGN PATENT DOCUMENTS

| DE | 22 36 973 | 2/1973 |
| DE | 27 05 540 | 8/1973 |
| DE | 25 25 408 | 12/1975 |
| DE | 36 36 901 | 5/1988 |
| DE | 39 20 675 | 1/1990 |
| DE | 43 01 184 | 7/1994 |
| DE | 43 01 256 | 7/1994 |
| EP | 0 334 355 | 9/1989 |
| EP | 0 443 795 | 8/1991 |

* cited by examiner

*Primary Examiner*—Don Wong
*Assistant Examiner*—Thuy Vinh Tran
(74) *Attorney, Agent, or Firm*—Frishauf, Holtz, Goodman, Langer & Chick, P.C.

(57) ABSTRACT

A method and a circuit for operating a direct current metal halide arc lamp. The lamp is activated by a periodic signal $U_L(t)$, and the duration $T_{aus}$ between the beginning of the fall from a maximum value and the subsequent rise in signal amplitude ranges from 1 to 50 μs. A pulsator is arranged between the ballast and the starter in addition to a direct current metal halide arc lamp which is filled by additional constituents, namely thallium, at a concentration of 0.6 to 3.0 μmol/ml in addition to an ignition gas, mercury, and lithium at a concentration of 0.2 to 0.5 μmol/ml.

21 Claims, 4 Drawing Sheets

METHOD FOR OPERATING DIRECT CURRENT METAL HALOGEN ARC LAMP CIRCUIT PERTAINING THERETO

FIELD OF THE INVENTION

The present invention relates to a method for operating a direct current metal halide arc lamp, to an associated circuit arrangement, and to a direct current metal halide arc lamp with a fill that is especially well suited to these purposes.

For example, direct current metal halide arc lamps are needed for projection applications. For good color reproduction, the spectrum at the location of the highest luminance, that is, upstream of the cathode, should include sufficient proportions of the primary colors, i.e., blue, green and red. It is known to use the fill elements of indium for blue and lithium for red. In typical projection lamps, however, the primary color red is especially lacking, since the radiation of the element lithium is emitted predominantly not from the site of highest luminance but from the jacket of the arc instead. It is true that the proportion of red in the light generated can be enhanced by increasing the proportion of lithium, but then it must be remembered that lithium predominantly has very long-wave emissions, thus producing a very dark red component. Since the spectral sensitivity of the human eye drops off markedly at the long-wave edge, then to the extent that the red component is based on the lithium emissions, a correspondingly enhanced spectral power must be generated if the desired light flux is to be generated. On the other hand, it has been found that adding lithium to the lamp fill increases the so-called color separation effect; that is, various spectral ranges of the light generated are generated at different sites in the lamp; this worsens the light quality for projection purposes, which is expressed in color fringes at the boundary or peripheral regions of projected images.

Corresponding problems arise in the operation of rectangular alternating current lamps.

PRIOR ART

For generating a discharge with enhanced brightness, it is known from German Patent Disclosure DE 39 20 675 to operate a short-arc discharge lamp with a constant base current, on which a periodic pulsed current is imposed. The pulse length is in the range from 0.03 to 3 ms, and the intervals between pulses vary between 0.1 and 10 ms. Triggering a direct current arc lamp with a signal whose intervals between pulses are in this range would cause the direct current arc lamp to go out, especially if an additional base current of high constant amplitude is not used. No relationship between the trigger signal and the spectrum of the light generated can be learned from this reference.

European Patent Disclosure EP 0 443 795 and U.S. Pat. Nos. 5,047,695 and 5,198,727 describe DC discharges with AC "ripples" superimposed on them; the AC ripples are in the frequency range between 20 and 200 kHz for acoustically tightening the arc.

SUMMARY OF THE INVENTION

It is therefore the object of the present invention to propose a method for operating a direct current metal halide arc lamp, in particular a direct current metal halide arc lamp for projection purposes, or a rectangular alternating current lamp, by means of which the photometric data are improved. It is also an object of the present invention to describe an associated circuit arrangement, as well as a direct current lamp with a fill that is especially well suited to operation according to the invention.

According to the invention, this object is attained by the characteristics of the independent claims.

The fundamental concept of the invention is to operate the direct current metal halide arc lamp with a clocked voltage signal. The signal is cyclically clocked during a period $T_{ein}$ to an ON amplitude and during the subsequent period $T_{aus}$ to a voltage of quantitatively lesser amplitude.

Advantageously, the time period $T_{ein}$ is between 10 and 100 μs, and the time period $T_{aus}$ is between 1 and 50 μs. The same is true for the operation according to the invention of rectangular alternating current lamps.

The invention offers the advantage of markedly increasing the radiation, upstream of the cathode, of the element lithium, or other elements of group 1A, that is, the red component. Since the normal calibration curve $x_\lambda$ is at its maximum in this spectral region, the tristimulus value x rises compared to y. Thus by adding an element with radiation lines in the range from 520 to 580 nm, such as thallium at 535.1 nm, the y value can be increased without exceeding the Planckian locus, and without the perceived color shifting toward greenish. Increasing the y value also increases the useful light flux. Surprisingly, in the operation according to the invention of direct current metal halide arc lamps, the change in convective flow conditions in the lam causes a marked reduction in the electrode temperatures, especially for the anode that is usually overloaded in metal halide d.c. lamps. This leads to an improvement in the light flux drop over time, or so-called maintenance, since there is a reduction in blackening and electrode consumption. The result is a longer service life of the direct current arc lamp.

In the circuit arrangement of the invention, it has proved especially advantageous to select the operation of the pulsator such that in the pulsator output signal, the voltage is essentially 0 V during the period $T_{aus}$. The same is correspondingly true for the circuit arrangement of the invention for operating a rectangular alternating current lamp; that is, in this case the amplitude values are $U_n$ and $-U_n$ during the time periods $T_{aus}$ and $T'_{aus}$ (see FIG. 4), and advantageously both are essentially 0 V.

To prevent acoustical resonances, the time period $T_{ein}$ or $T'_{ein}$ can be varied periodically, for instance being swept with a sweep frequency of 50 to 500 Hz, preferably 100 Hz. The time period $T_{aus}$ or $T'_{aus}$ can either be constant or be varied as well. If $T_{aus}$ or $T'_{aus}$ is varied, then especially advantageously it is possible to perform a variation with adaptation to the variation of $T_{ein}$ and $T'_{ein}$, with the goal that the minimal voltage value generated in the signal downstream of the starter for triggering the rectangular alternating current lamp remains quantitatively constant despite the variation of $T_{ein}$ and $T'_{ein}$, respectively. Other advantageous embodiments are described in the dependent claims.

DESCRIPTION OF THE DRAWINGS

Shown are:

FIG. 1b, voltage courses for a first exemplary embodiment at various locations in the circuit arrangement of FIG. 1a;

FIG. 1c, current courses for a first exemplary embodiment at various locations in the circuit arrangement of FIG. 1a;

FIG. 4b, voltage courses at various locations in the circuit arrangement of FIG. 4a.

DETAILED DESCRIPTION OF THE PREFERRED EMBODIMENTS

Figure 1A:
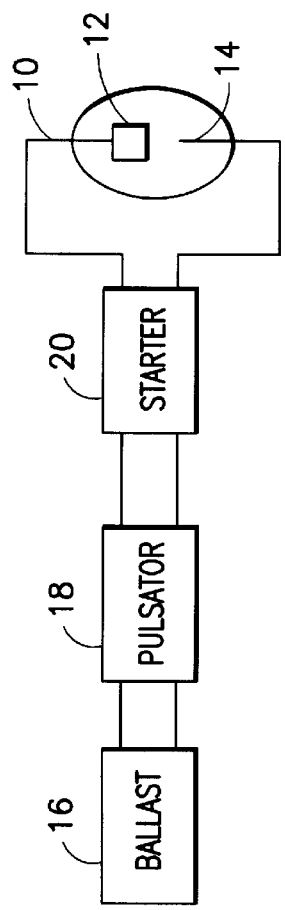
FIG. 1a, a block circuit diagram of a circuit arrangement for operating a direct current metal halide arc lamp with a clocked direct voltage signal.

FIG. 1a shows a block circuit diagram of a circuit arrangement for operating a direct current metal halide arc lamp 10, which includes an anode 12 and a cathode 14. This circuit arrangement includes an electric ballast 16, a pulsator 18, and a starter 20.

Figure 1B:
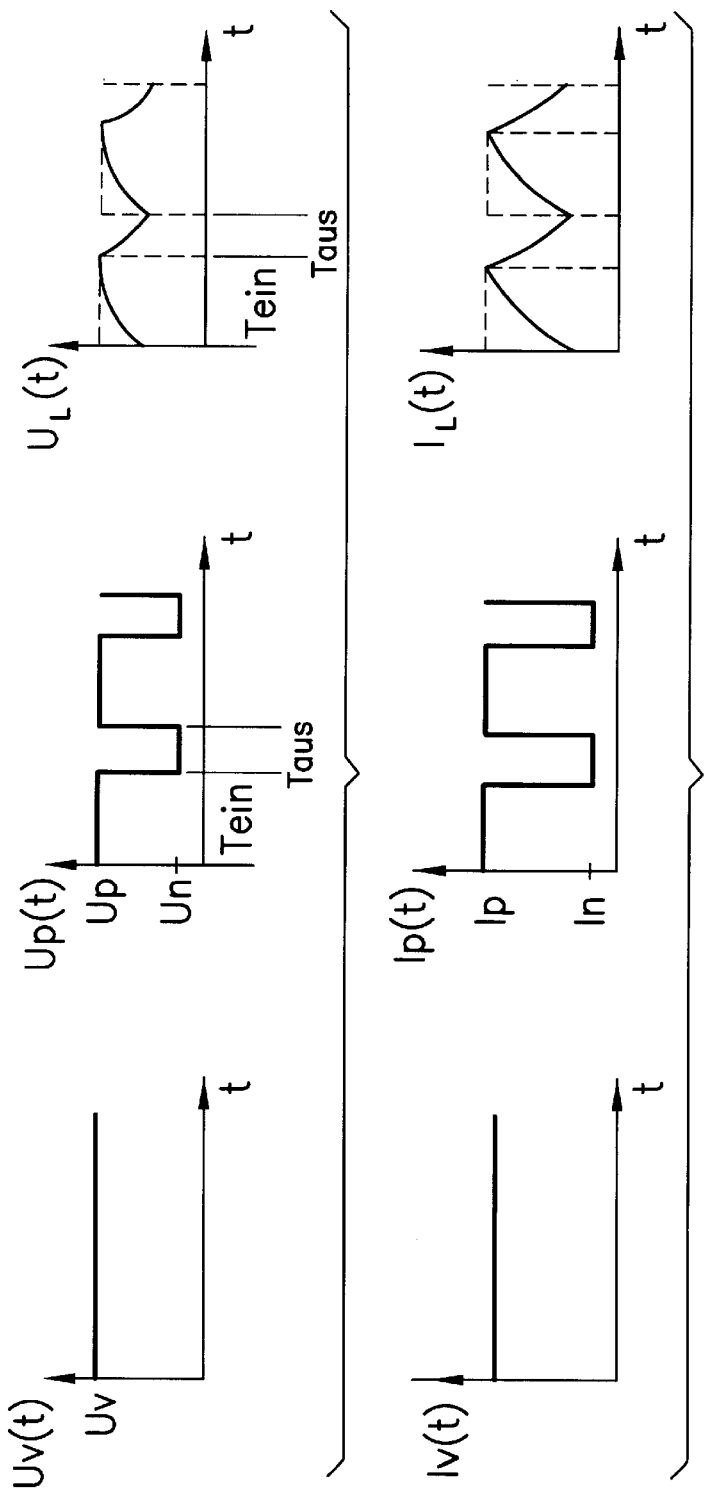

In FIG. 1b, the course over time of the output voltage downstream of the electric ballast 16 is shown on the left. As can be seen, this is a signal of constant voltage $U_v$. In the middle of FIG. 1b, the course over time of the voltage $U_p(t)$ downstream of the pulsator 18 is shown. During a time period $T_{ein}$, the voltage has the amplitude $U_p$, while conversely during a time period $T_{aus}$ it is $U_n$. Here $U_n$ is less than $U_p$; preferably, $U_n$ is essentially 0 V. The graph on the right in FIG. 1b shows the voltage course downstream of the starter 20, that is, the course of the voltage $U_L(t)$ applied to the lamp. This is equivalent to a sawtooth signal; the rise in the voltage $U_L(t)$ during the time $T_{ein}$ and the drop in the voltage $U_L(t)$ during the time $T_{aus}$ is primarily affected by the inductances of the starter 20. The intended achievement is also, however, attained when the lamp is triggered directly with a square-wave or triangular signal. What is essential is that the intervals, or in other words in the case of a square-wave signal the times of low voltage or in the case of a sawtooth or triangular signal the times when the voltage drops from a maximum value to a minimum value, are—optionally only locally—in the range between 1 and 50 μs. The signal $U_L(t)$ that drives the lamp can also be generated separately, or in other words without the influence of the starter, for instance by a suitably sampled square-wave signal or by the addition of a direct voltage signal to a sawtooth signal. It is then applied to the lamp in addition to an ignition circuit that is used for starting the lamp and is not used thereafter.

Figure 1C:

The three graphs in FIG. 1c show, from left to right, the course over time of the current $I_V(t)$ downstream of the electric ballast 16, the course over time of the current $I_p(t)$ downstream of the pulsator 18, and the course over time of the current $I_L(t)$ downstream of the starter 20, that is, the current flowing via the lamp. In the exemplary embodiment shown in FIGS. 1b and 1c, the time period $T_{ein}$ and the time period $T_{aus}$ are constant during the operation of the lamp.

In operation of the lamp in this exemplary embodiment, after it has been ignited or started and after a certain run-up time, that is, until a fixed lamp voltage is exceeded, the constant direct voltage is chopped by the pulsator. The time period $T_{ein}$ is between 10 and 100 μs. Especially advantageous results are demonstrated where $T_{ein}=35$ μs and $T_{aus}=13$ μs and $U_n=0$ V. Assuming a loss-free pulsator and starter, where $T=T_{ein}+T_{aus}$, the following power balance applies: mean lamp power=mean power at pulsator=constant electric ballast power, or $$\frac{1}{T}\int_0^T I_L(t) \cdot U_L(t)\, dt = U_P \cdot I_P \cdot \frac{T_{ein}}{T_{aus}+T_{ein}} + U_n \cdot I_n \cdot \frac{T_{aus}}{T_{aus}+T_{ein}} = U_V \cdot I_V$$

It follows from this that as the OFF time $T_{aus}$ increases, the amplitude of the pulsed lamp current and the pulsed lamp voltage increases.

Figure 2:
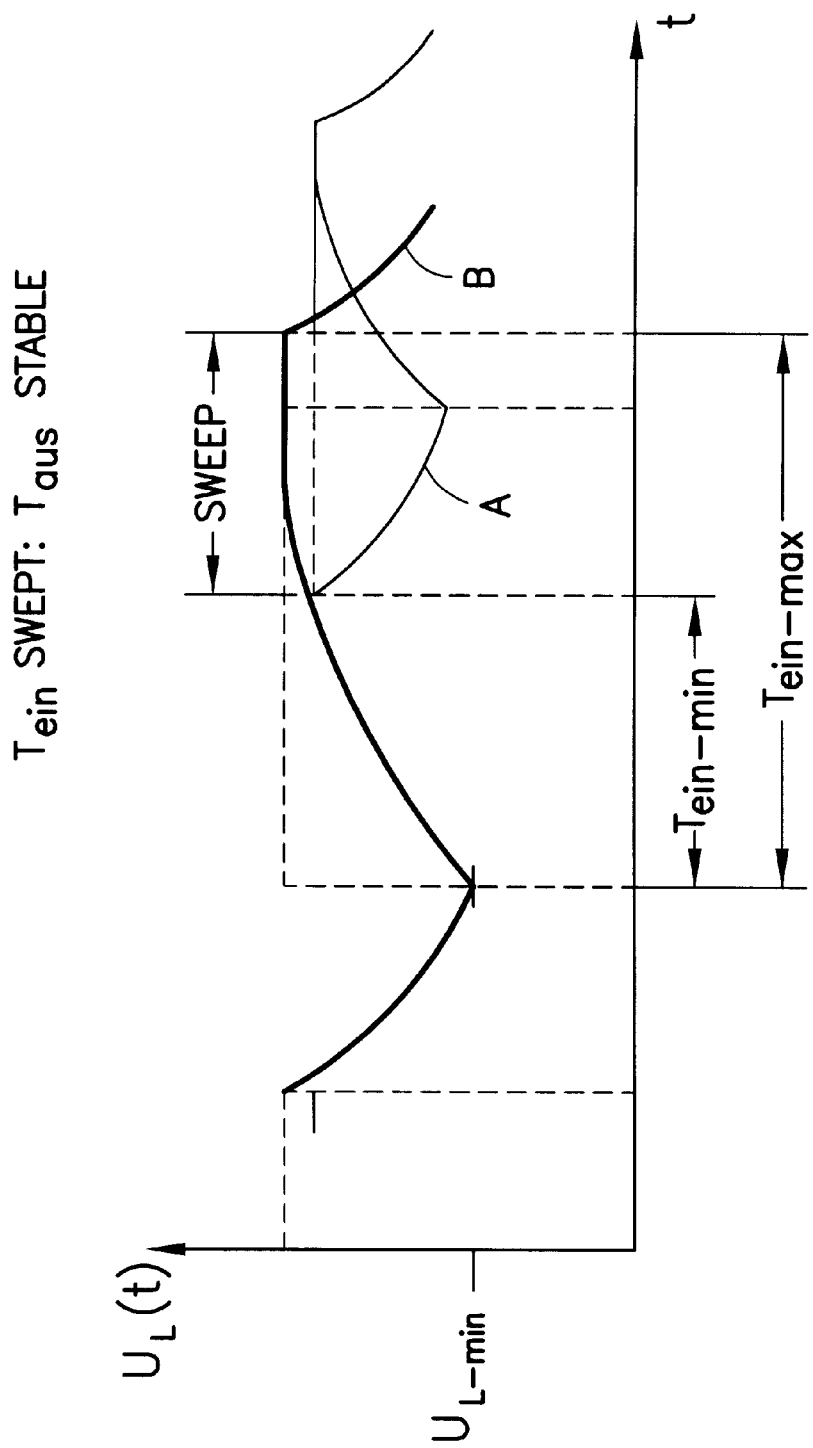
FIG. 2, the voltage course downstream of the starter in the circuit arrangement of FIG. 1a for a second exemplary embodiment.

In FIG. 2 the course over time of the voltage $U_L(t)$ for a second exemplary embodiment is schematically shown as an example. In this exemplary embodiment, the circuit arrangement of FIG. 1a is supplemented with a device that makes it possible to vary the time period $T_{ien}$ between a minimum value $T_{ein\_min}$ and a maximum value $T_{ein\_max}$, or in other words to sweep through continuously between $T_{ein\_min}$ and $T_{ein\_max}$ with a frequency F. Curve A shows the course of the voltage $U_L(t)$ at the onset of the sweep period, while curve B shows the course of the voltage $U_L(t)$ at the end of one period length of the sweep frequency F. The sweep frequency F is typically between 50 and 500 Hz, preferably 100 Hz. This mode of operation makes it possible to prevent acoustic resonances.

In exemplary embodiments not shown, $T_{ein}$ can be constant, while $T_{aus}$ is varied with a sweep frequency F between $T_{aus\_min}$ and $T_{aus\_max}$, while in a further exemplary embodiment both $T_{ein}$ and $T_{aus}$ are varied with a sweep frequency F. The ratio between $T_{ein}$ and $T_{aus}$ can be adjusted in each case such that the resultant minimum value $U_{Lmin}$ is constant throughout operation.

Figure 3:
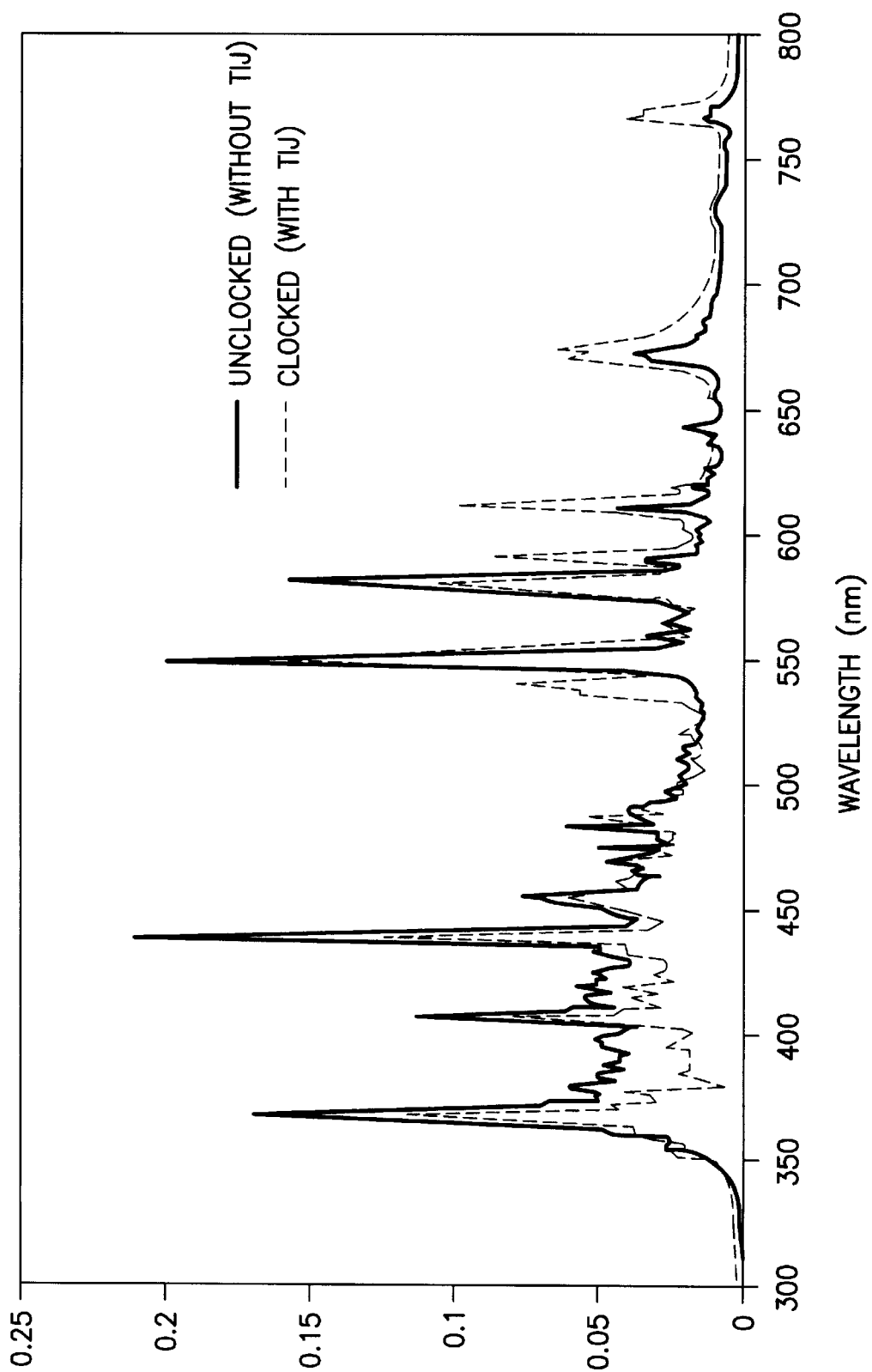
FIG. 3 the reflector spectrum through a 6-millimeter aperture for an unclocked direct current metal halide arc lamp whose fill contains no thallium, and for a clocked direct current metal halide arc lamp where $T_{ein}=35$ μs and $T_{aus}=13$ μs, where the fill of the direct current metal halide arc lamp contains thallium iodide in a concentration of 0.36 mg/ml.

In FIG. 3, the reflector spectrum through a 6-millimeter aperture is shown for two differently operated direct current metal halide arc lamps with different fills. The course drawn in heavy lines shows the spectrum of a direct current metal halide arc lamp that is operated in accordance with the prior art, or in other words is not clocked, and its fill does not contain any thallium iodide; the course drawn in fine lines shows the spectrum in clocked operation, that is, in the present case where $T_{ein}=35$ μs and $T_{aus}=13$ μs, and where the lamp fill contains thallium iodide in a concentration of 0.36 mg/ml. It is striking that by the clocked operation, the radiation of the element lithium has been markedly enhanced, especially at 610.3 nm but also at 670.7 nm. Since the normal calibration curve $x_\lambda$ in this spectral region is at a maximum, the tristimulus value x rises compared to y. Thus by adding an element with radiation lines in the range from 510 to 580 nm, in this case thallium at 535.1 nm, the y value can be increased without exceeding the Planckian locus, and without the perceived color shifting toward greenish. Increasing the y value also increases the useful light flux.

For a 270 W direct current metal halide arc lamp with an operating voltage of 40 V, an electrode spacing of 1.9 mm, a lamp volume of 0.7 ml, a wall load of 65 W/cm², a service life of about 2000 hours, and with a fill containing 23.5 mg of mercury, 200 mbar of Argon, 0.51 mg of $HgBr_2$, 0.05 mg of InI, 0.08 mg of LiI, 0.19 mg of $ZnI_2$, 0.07 mg Gd and 0.06 mg of Y, a color temperature of about 9000 K and a color location of x=0.28, y=0.32 was attained in an unclocked mode of operation.

In an unclocked mode of operation, the color temperature of a lamp with the same fill, supplemented with an additional constituent of 0.25 mg of thallium iodide, is about 8000 K and the color location is x=0.29, y=0.34, while in clocked operation of the same lamp, with $T_{ein}=35$ μs and $T_{aus}=13$ μs and $U_n=0$ V, the color temperature is about 6000 K and the color location is x=0.32, y=0.34., Because of the increase in the y value, the useful light flux rises by about 5 to 10%.

The concentration of lithium, which is preferably added in the form of lithium iodide or lithium bromide, is from 0.2 μmol/ml to 5 μmol/ml.

The concentration of thallium, which is preferably added in the form of thallium iodide or thallium bromide, can be up to a value of 3 μmol/ml and is preferably between 0.6 μmol/ml and 3 μmol/ml.

Figure 4A:
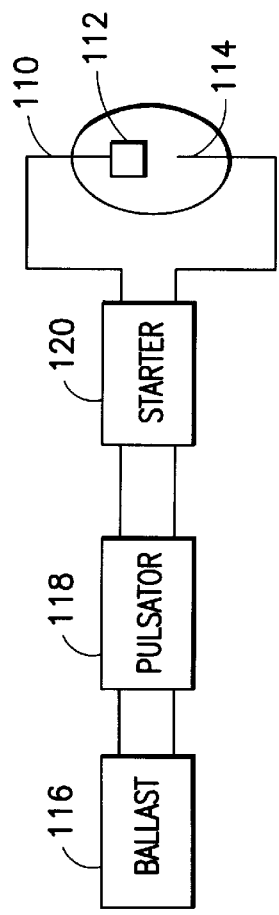
FIG. 4a, a block circuit diagram for operating a rectangular alternating current lamp with a chopped square wave signal.

The idea of the invention of clocking a signal, which has a course of constant amplitude over a relatively long time period, to a voltage of quantitatively lower amplitude can also be applied according to the invention to the operation of rectangular alternating current lamps, where once again the time periods of lower voltage are preferably between 1 and 50 μs. FIG. 4a shows a circuit arrangement for operating a rectangular alternating current lamp. A ballast 116 is followed by a pulsator 118, which is adjoined by a starter 120. The rectangular alternating current lamp is indicated by reference numeral 110, and it includes two identical electrodes 112, 114.

Figure 4B:
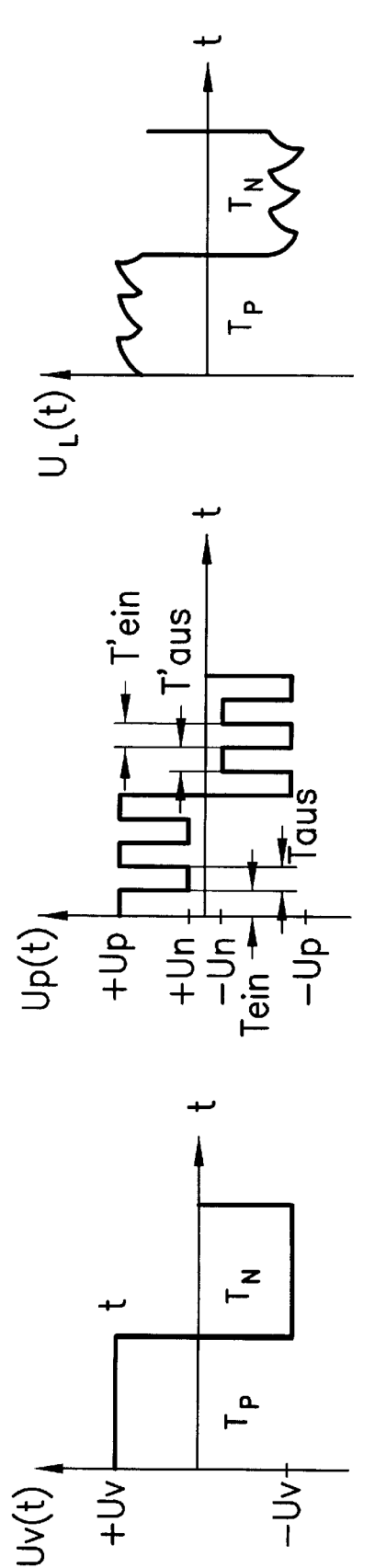

As the output signal of the ballast 116, FIG. 4b shows a square-wave alternating signal that during a time period $T_p$ has a voltage amplitude of $+U_v$ and during a time period TN has a voltage amplitude of $-U_v$. The signal downstream of the pulsator 118 is distinguished in that the voltage is chopped both during the time period $T_p$ and during the time period $T_N$. This means that within the time period $T_p$, there are ranges with time periods $T_{ein}$, during which the signal has the amplitude $+U_p$, and ranges of $T_{aus}$ during which the signal has the amplitude $+U_n$, and that within the range $T_N$ there are ranges of the time period $T'_{ein}$ during which the voltage has the amplitude $-U_P$ and ranges $T'_{aus}$ during which the voltage has the amplitude $-U_n$. The quantity of $U_n$ is less than the quantity of $U_p$, and especially advantageously, $U_n = -U_n 0$ V. Instead of constant values for $U_n$ and $U_p$, amplitude ranges that do not overlap can also be considered. The signal downstream of the starter 120, that is, the signal that is applied to the lamp, is distinguished by a sawtooth-like course, both in the positive voltage range and in the negative voltage range. Alternatively, a chopped square-wave alternating signal similar to that shown in the middle of FIG. 4b, or a signal that has a triangular course instead of the square waves of the durations $T_{ein}$, $T_{aus}$, $T'_{ein}$ and $T'_{aus}$, can also be used. What is essential is that the time periods $T_{aus}$ and $T'_{aus}$, that is the time periods of lesser amplitude or with the drop from a—possibly local—maximum to a—once again local—minimum be in the range between 1 and 50 μs, both in the range of positive voltage and in the range of negative voltage.

Here as well, the signal that triggers the lamp in operation can be generated separately and not delivered to the lamp until after the lamp has been ignited. $U_L(t)$ can be generated for instance by adding a square-wave alternating signal and a sawtooth signal.

The time periods $T_{ein}$ and $T'_{ein}$ are preferably between 10 and 100 μs. As in the method for operating a direct current metal halide arc lamp, $T_{ein}$, $T'_{ein}$, $T_{aus}$, and $T'_{aus}$ can be constant, independently of one another, or they can be varied over time. The sum of $T_p$ and $T_n$ yields a frequency $F_R$ on the order of magnitude of 50 to 600 Hz. If the sub-time periods $T_{ein}$, $T'_{ein}$, $T_{aus}$ and $T'_{aus}$ are varied, the variation over time can be tuned to the frequency $F_R$, preferably such that during the time period $T_p$ or $T_N$, one complete period of the sweep frequency F can elapse. The sweep frequency F is between 50 and 1500 Hz.

A further embodiment provides for chopping only the voltage during the time period $T_p$ or only the voltage during the time period $T_N$, and leaving the respectively other voltage unchopped.

What is claimed is:

1. A method for operating a metal halide arc lamp having asymmetrical electrodes (12, 14) and having an ionizable fill, characterized in that only after its ignition, the metal halide arc lamp is triggered with a periodic clocked signal ($U_L(t)$), and the time period $T_{aus}$ between the onset of the drop from a maximum value and the ensuing rise in the signal amplitude is between 1 and 50 μs.

2. The method of claim 1, in which the fill contains no sodium.

3. The method of claim 1, in which the fill contains at least one element from the group A1, in particular lithium.

4. The method of claim 1, characterized in that the time period $T_{ein}$ between two successive time periods $T_{aus}$ is between 10 and 100 μs.

5. The method of claim 1, characterized in that the time period $T_{ein}$ is swept through at a frequency F in a range of $T_{ein\_min}$ and $T_{ein\_max}$.

6. The method of claim 5, characterized in that the sweep frequency F is between 50 and 500 Hz.

7. The method of claim 1, characterized in that the time period $T_{ein}$ is swept through at a frequency F in a range of $T_{aus\_min}$ and $T_{aus\_max}$.

8. The method of claim 1, characterized in that the minimum value of the signal ($U_L(t)$) is greater than 0 V.

9. The method of claim 1, characterized in that the fill of the metal halide arc lamp includes at least the following constituents:

an ignition gas mercury a halide, and lithium in a concentration of 0.2 μmol/ml to 5 μmol/ml, and an additional constituent of thallium in a concentration of 0.6 μmol/ml to 3 μmol/ml.

10. A circuit arrangement having a metal halide arc lamp with asymmetrical electrodes (12, 14), an electric ballast and a starter, characterized in that a pulsator is connected between the electric ballast and the starter, and the pulsator is designed to furnish at its output a clocked direct voltage signal ($U_p(t)$), which has a voltage in a first range ($U_p$) during a first time period $T_{ein}$ and a voltage in a second range ($U_n$) during a second time period $T_{aus}$, and the voltage values of the second range are less than the voltage values in the first range, and $T_{aus}$ is between 1 and 50 μs.

11. The circuit arrangement of claim 10, characterized in that the time period $T_{ein}$ is between 10 and 100 μs.

12. The circuit arrangement of claim 10, characterized in that it includes an apparatus with which the time period $T_{ein}$ can be swept through at a frequency F in a range from $T_{ein\_min}$ and $T_{ein\_max}$.

13. The circuit arrangement of claim 12, characterized in that the sweep frequency F is between 50 and 500 Hz.

14. The circuit arrangement of claim 10, characterized in that it includes an apparatus with which the time period $T_{aus}$ can be swept through at a frequency F in a range from $T_{aus\_min}$ and $T_{aus\_max}$.

15. The circuit arrangement of claim 10, characterized in that the voltage in the second range is substantially 0 V.

16. A circuit arrangement of claim 10, characterized in that the fill of the metal halide arc lamp includes at least the following constituents:
an ignition gas
mercury
a halide, and
lithium in a concentration of 0.2 μmol/ml to 5 μmol/ml, and
an additional constituent of thallium in a concentration of 0.6 μmol/ml to 3 μmol/ml.

17. A method for operating a rectangular alternating current lamp, in which the rectangular alternating current lamp is triggered with a signal ($U_L(t)$) having an amplitude greater than or equal to 0 during a first time period ($T_P$) and an amplitude less than or equal to 0 during a second time period ($T_N$), and the signal ($U_L(t)$) within the first time period ($T_P$) has n ranges, where n≧1, and/or within the second time period ($T_N$) has m ranges, where m≧1, in which ranges the absolute quantity of the signal amplitude is less than the absolute quantity of the maximum signal amplitude within the associated time period ($T_P$; $T_N$), and in the range $T_P$ the time period $T_{aus}$ between the onset of the drop from a maximum value and the ensuing rise in the signal amplitude, or in the range TN the time period $T'_{aus}$ between the onset of the rise from a minimum value and the ensuing drop in the signal amplitude, is between 1 and 50 μs, characterized in that the signal ($U_L(t)$) has no intervals between pulses and is not delivered to the rectangular alternating current lamp until after the rectangular alternating current lamp has been ignited.

18. The method of claim 17, characterized in that the time period $T_{ein}$ or $T'_{ein}$ between two successive time periods $T_{aus}$ or $T'_{aus}$ is between 10 and 100 μs.

19. The method of claim 17, characterized in that the time period $T_{ein}$ or $T'_{ein}$ is swept through at a frequency F in a range of $T_{ein\_min}$ and $T_{ein\_max}$.

20. The method of claim 19, characterized in that the sweep frequency F is between 50 and 1500 Hz.

21. The method of claim 17, characterized in that the time period $T_{aus}$ or $T'_{aus}$ is swept through at a frequency F in a range of $T_{aus\_min}$ and $T_{aus\_max}$.

* * * * *